S. F. ARBUCKLE.
AUTOMOBILE HEADLIGHT CONTROL.
APPLICATION FILED OCT. 16, 1917.
1,256,284.
Patented Feb. 12, 1918.
2 SHEETS—SHEET 1.
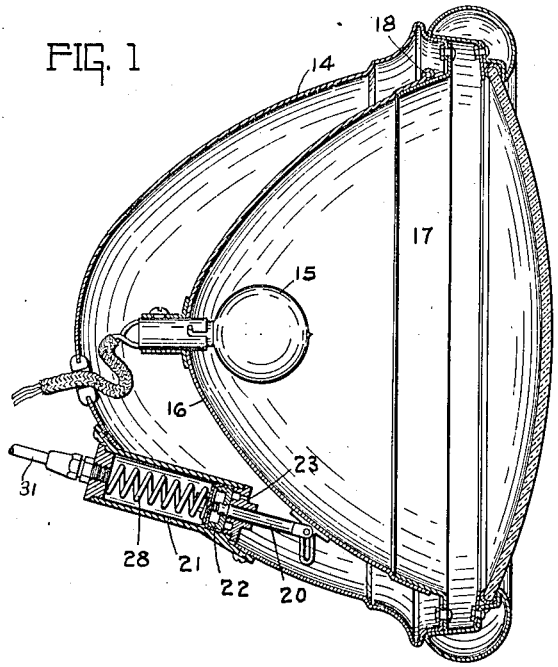
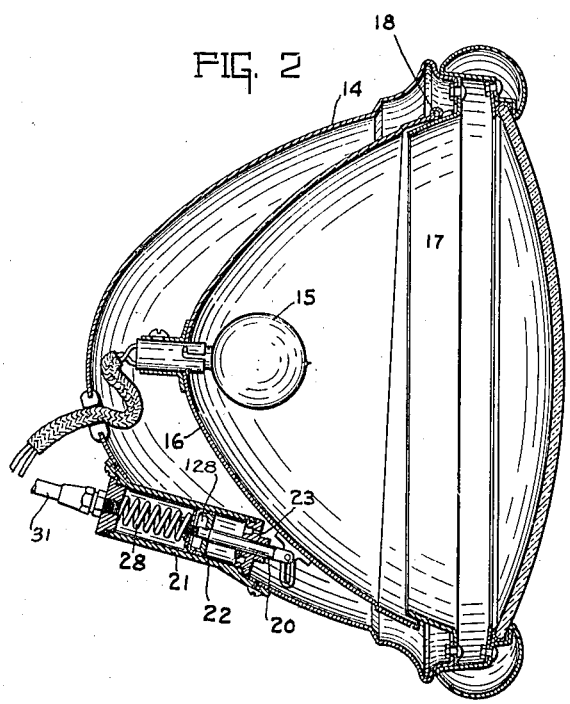
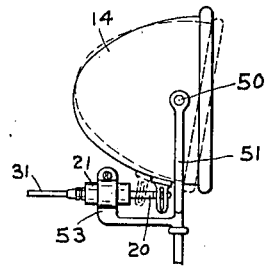
INVENTOR
SAMUEL F. ARBUCKLE
BY
Lockwood & Lockwood
ATTORNEYS S. F. ARBUCKLE.
AUTOMOBILE HEADLIGHT CONTROL.
APPLICATION FILED OCT. 16, 1917.
1,256,284.
Patented Feb. 12, 1918.
2 SHEETS—SHEET 2.
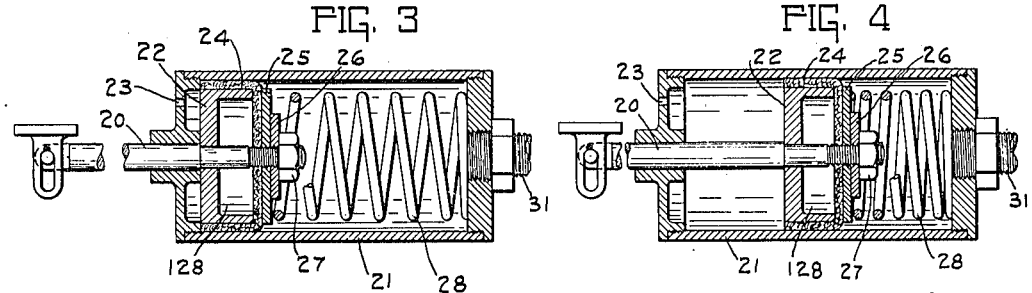
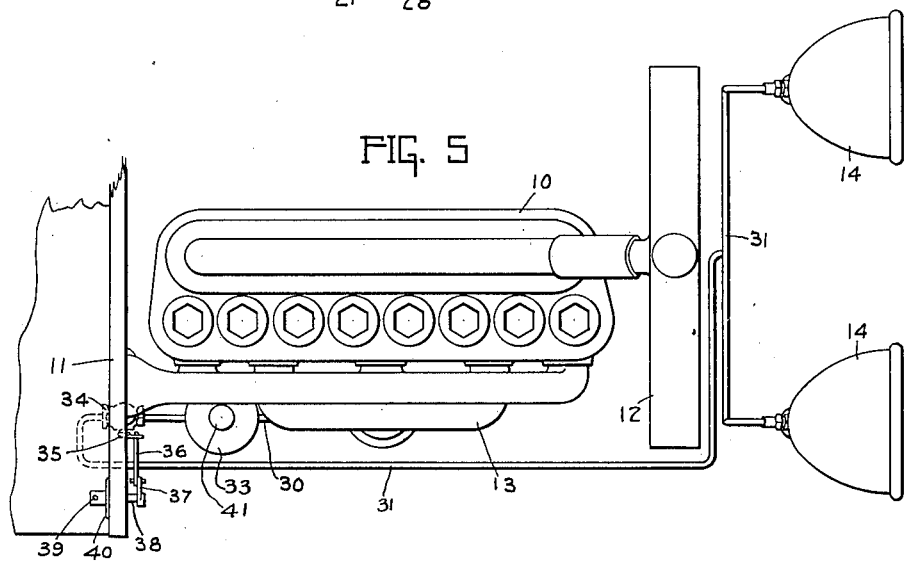
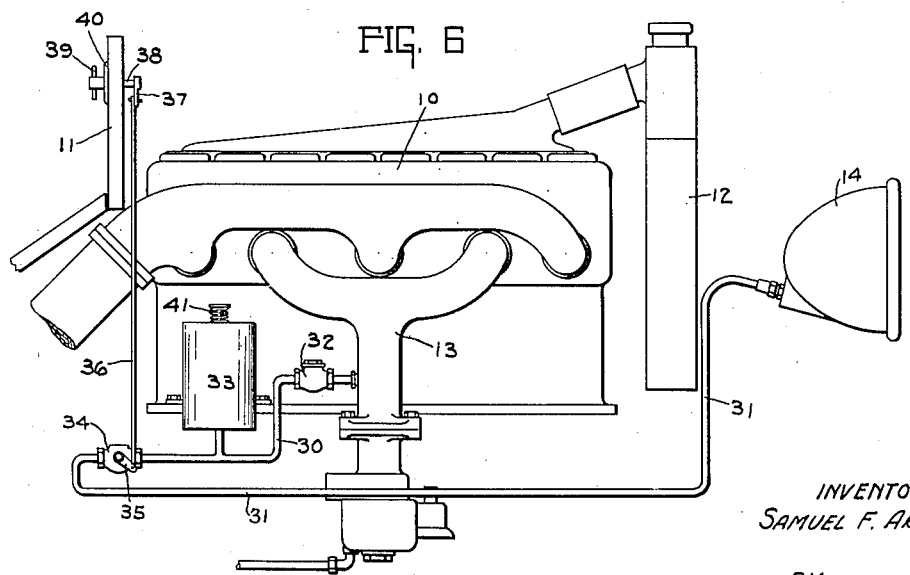
INVENTOR
SAMUEL F. ARBUCKLE
BY
*Lockwood & Lockwood*
ATTORNEYS.

UNITED STATES PATENT OFFICE.

SAMUEL F. ARBUCKLE, OF INDIANAPOLIS, INDIANA.

AUTOMOBILE-HEADLIGHT CONTROL.

1,256,284.   Specification of Letters Patent.   Patented Feb. 12, 1918.

Application filed October 16, 1917. Serial No. 196,843.

*To all whom it may concern:*

Be it known that I, SAMUEL F. ARBUCKLE, a citizen of the United States, and a resident of Indianapolis, county of Marion, and State of Indiana, have invented a certain new and useful Automobile-Headlight Control; and I do hereby declare that the following is a full, clear, and exact description thereof, reference being had to the accompanying drawings, in which like letters refer to like parts.

The object of this invention is to provide a particular and efficient construction of apparatus for automobiles, launches and the like for deflecting, turning or tilting the headlight thereof. In automobiles the headlights are, in this invention, tilted to throw the shaft of light downward, out of the eyes of persons driving an approaching automobile on the highway.

In the dimming method of avoiding a glare in automobile headlights, the difficulty is that often the dimmed lamp does not sufficiently light the roadway in advance of the automobile as to make the travel safe while passing another automobile. It endangers one driving off the highway into a side ditch and upsetting. In this arrangement the power of the light is not diminished but is turned down so as to illuminate the roadway in front of the car. That makes the driving of the car safe and turns the glare of the headlights away from an approaching automobile.

A feature of this invention consists in means for utilizing the partial vacuum or suction in the intake manifold or other chamber in communication with the cylinders of the internal combustion engine for turning or tilting the lamp. This means is controllable by the driver of the automobile, by means mounted in the dash. The means operated by the driver actuates a valve which controls a passageway or pipe leading from the intake of the engine, directly or indirectly to movable means connected with the lamp, whereby said valve controls and directs the suction power in the vacuum pipe or conduit and in this manner the extent of the turning or tilting movement of the lamp may be governed by the controlling device from the dash.

Another feature of the invention consists in the particular construction of the means actuated by the suction or vacuum for applying power to turn or tilt the lamp. For this purpose a cylinder is employed which is secured to the lamp casing or frame in a stationary position and is at one end connected with the vacuum line and in the other end a piston is located which has a piston rod connected with a movable member of the lamp. The piston has considerable peripheral area and the periphery thereof is of yielding material so there is very slight wearing action resulting from the jar of the lamp. The jar of the lamp is probably greater than the jar of any other part of an automobile and to avoid the movable parts from wearing out quickly on account of this jar is one of the objects and features of this invention.

Furthermore the piston is provided with a chamber for holding lubricant permanently so as to keep the packing moist and cause a uniform action of the device for a long period of time.

Still another feature of the invention consists of a particular construction of the lamp structure for use in connection with the vacuum controlling means. The lamp is provided with a divided reflector. The fore portion of the reflector is secured stationary while the rear portion carries the lamp and is hinged preferably at the top, with the remainder free so as to tilt backward and forward, and actuating means is connected to the lower part thereof. Therefore only the rear movable part of the reflector is tilted. This makes a very strong and satisfactory arrangement in construction.

The full nature of this invention will be understood from the accompanying drawings and the following description and claims.

In the drawings Figure 1 is a central vertical section through the tilting lamp construction with a portion of the controlling means connected therewith, the parts being in normal position.

Fig. 2 is the same with the lamp in tilted position for directing the shaft of light downward.

Fig. 3 is a central longitudinal section of the means attached to the lamp for tilting it in normal position and parts being broken away.

Fig. 4 is the same in acuated position.

Fig. 5 is a plan view of the lamps, engine and associate parts, parts being broken away.

Fig. 6 is a side view thereof. Fig. 7 is a side elevation of a modified form of lamp structure.

The construction herein illustrated for the purpose of explaining the general nature of this invention includes an internal combustion engine 10 in the front part of an automobile having a dash 11 and a radiator 12, the other parts of the automobile not being shown. The engine has the usual intake manifold 13, and a part of the lamp structures or casings 14 is rigidly mounted in the front end of the car as usual, the particular mounting not here being shown as it constitutes no part of this invention.

In the lamp structure the lamp 15 is mounted in the center of a parabolic reflector 16 which is mounted so as to be tiltable. As here shown the reflector as a whole is divided into two parts, the tiltable part 16 in which the lamp is mounted and the stationary part 17 which is rigidly secured to the lamp case 14. The part 17 is the front part of the reflector as a whole and is annular; the tilting part 16 of the reflector is hinged at 18 on top of the part 17 of the reflector, the remainder of the part 16 being free so that it can tilt or swing back and forth. The forward annular portion of the tilting reflector 16 overlaps and surrounds the stationary part 17 of the reflector, as shown.

The means for tilting or controlling the position of the lamp and tilting the reflector is a piston rod 20 which at one end is pivoted to the lower part of the tilting reflector and at the other end extends into a cylinder 21 which is rigidly secured into position as herein shown to the stationary casing 14 of the lamp. A piston or plunger 22 is secured to the inner end of the piston rod so, when the parts are in normal position with the shaft of light thrown straight ahead, it will be near the front or open end of the cylinder 21. That end is open to the outer air by reason of one or more air ports 23, see Fig. 3. The plunger or piston is cup shaped and the open end of it is closed by a leather packing disk 24 which surrounds the periphery of the piston and is held in place by a large washer 25, a small washer 26, and a nut 27. This forms a chamber 128 in the piston for holding grease or lubricant permanently for softening and lubricating the leather part of the piston and the parts associated therewith. With this arrangement no attention need be paid to the lubrication of this part of the mechanism for very long periods at a time, and the leather will be kept in good condition for effecting an airtight fit with the cylinder 21. Also the length of the piston is such that the very great jarring of the lamp will not cause any wear of the parts, particularly in view of the leather disk 24.

A spiral spring 28 lies in the cylinder between one end thereof and the piston for the purpose of returning the piston after actuation of the tilting lamp or reflector and holding them in their normal position, excepting when overcome by the suction of the engine and the piston actuated from the position shown in Fig. 3 to that shown in Fig. 4. For actuating said piston there is a conduit leading from the intake manifold 13 of the engine to the cylinder 21. This conduit consists of a pipe 30 leading to a pipe 31 which leads to the cylinder 21 of both lamps. In this conduit there is a check valve 32 located between the intake manifold 13 and the vacuum chamber 33. There is also a valve 34 located in said conduit between the vacuum chamber 33 and the lamps and it is actuated and controlled by the driver of the automobile by means of an arm 35 and the valve 34, pivotal rod 36 extending upward therefrom to an arm 37 on an arbor 38 that extends through the dash 11 and has on its rear end a handle 39 for operating the same. A visible dial plate 40 is associated with said operating means.

The means for operating the valve 34 is such that it can be entirely closed and in that event the lamps will be maintained in a normal position as shown in Fig. 1 and will form the function of the usual headlight by throwing shafts of light straight ahead. That position of the lamp is caused by the expansion of the spring 28 in the cylinder 21.

When, however, another car is approaching on the highway, or for any other reason it is desired to cause the shafts of light to be thrown downward on the roadway near the front end of the car on which the lamps are mounted, the valve 34 is opened and then the suction of the engine or partial vacuum in the manifold 13, acting on the cylinders 21 through the intermediate conduit, causes the external air pressure to force the piston 22 inward as shown in Fig. 2, against the spring 28 and compress that spring, and thus draw back the lower part of the reflectors 16 and tilt the lamps downward.

Since the partial vacuum in the manifold is considerable the spring 28 can be considerably compressed so as to give considerable tilting to the lamps. By means of the valve 34, however, the effect of this partial vacuum or suction of the pistons 22 can be regulated so as to regulate the slowness and the extent of the tilting movement of the lamps. Thus by opening the valve 34 very slightly so that a partial vacuum in the conduit between said valve and the lamps will be less than in the manifold 13, the lamps will be tilted slowly and given only a slight movement. In this manner the driver of the automobile can easily control the position of his lamps so as to throw the shafts of light where he wishes them between whatever limits each way are fixed.

In order to improve and facilitate the operation of this apparatus the vacuum chamber 33 is mounted in a stationary position and in communication with the conduit 30 between the two valves, the valve 32 being normally open. The partial vacuum in chamber 33 will be therefore substantially the same as in the manifold 13, and it operates on a line between it and lamps and the pistons 22 and the cylinders 21, the same as the partial vacuum in the intake manifold. The vacuum chamber 33 is provided with a spring controlled safety valve 41 in the top of it, so that if the partial vacuum or suction becomes too great in said chamber, it will be automatically relieved by said safety valve.

In the modified form shown in Fig. 7 the lamp casing 14 is vertically tiltable, as it has lateral openings 50 mounted in bifurcated arms 51, which are stationary and the piston rod 20 of the lamp actuating the tilting means is pivoted to the lower end of the lamp casing 14, so as to swing the whole lamp or rock it on its axis as indicated by dotted lines in Fig. 7. It is understood that the reflector in this lamp is stationary as provided in the usual lamp structure. The cylinder 21 is secured in a rigid bracket 53 extending from the arms 51.

The foregoing explains the general nature of this invention, which however permits of considerable variation which will occur to any person skilled in the art without departing from the spirit of the invention. Thus it is immaterial where the spring is located or what it actuates so long as its function is to return the lamp and reflector to normal position, or to oppose the movement of the piston under the influence of the external air pressure. The function of the check valve 32 is important as it influences the high degree of vacuum to be maintained in the chamber 33, even higher often than the degree of vacuum in the manifold. Thus the degree of vacuum in the vacuum chamber 33 is, until the lamps are operated, as high as the very highest degree of vacuum that may have existed in the manifold at any time. The subsequent reduction of the degree of vacuum in the manifold, on account of this check valve, will not reduce the degree of vacuum in the chamber 33. This also tends to give uniformity to the degree of vacuum in the chamber 33 and to the operation of the lamp tilting mechanism.

The invention claimed is:

1. The combination with an internal combustion engine, and a movable lamp, of means controlled by the suction of the engine for moving said lamp.

2. The combination with an internal combustion engine, of a lamp structure having a movable reflector, and means controlled by the suction of the engine for moving said reflector.

3. The combination with an internal combustion engine, and a movable lamp, of means for moving the same, and a conduit leading therefrom to the intake of the engine for utilizing the partial vacuum of said intake for causing the operation of said lamp moving means.

4. The combination with an internal combustion engine, and a movable lamp, of means connected with the lamp for moving the same, a conduit leading therefrom to the intake of the engine for utilizing the partial vacuum of said intake for causing the operation of said lamp moving means, and a spring for causing the return of said movable lamp to the normal position.

5. The combination with an internal combustion engine, and a movable lamp, of means connected with the lamp for moving the same, a conduit leading therefrom to the intake of the engine for utilizing the partial vacuum of said intake for causing the operation of said lamp moving means, and a valve in said conduit for controlling the partial vacuum therein.

6. The combination with an automobile, an internal combustion engine for driving the same, and a movable headlight for said automobile, of means for moving said headlight, a conduit for enabling the suction of the engine to permit and control the movement of said headlight, and a valve for controlling said conduit.

7. The combination with an automobile having a dash, an internal combustion engine for driving the same, and a movable headlight for said automobile, of means for moving said headlight, a conduit for enabling the suction of the engine to permit and control the movement of said headlight, a valve for controlling said conduit, and means mounted in the dash of the automobile and extending to said valve for operating the same.

8. The combination with an internal combustion engine, and a movable lamp, of means for moving said lamp that is controllable by suction, a conduit leading to said means from the intake manifold of the engine, a controlling valve in said conduit, and a vacuum chamber connected with said conduit between the intake manifold and said valve.

9. The combination with an internal combustion engine, and a movable lamp, of means for moving said lamp that is controllable by suction, a conduit leading to said means from the intake manifold of the engine, a controlling valve in said conduit, a vacuum chamber connected with said conduit between the intake manifold and said valve, and a safety valve for said vacuum chamber.

10. The combination of an automobile, an internal combustion engine for driving the same, and a pair of movable lamps associated therewith, of means for moving each lamp which is controllable by suction from the engine, a pipe connecting said lamp moving means, a pipe leading from said connecting pipe to the intake manifold of the engine, and a valve for controlling said last mentioned pipe.

11. The combination with an internal combustion engine, and a movable lamp, of a cylinder with one end in communication with the engine and the other end in communication with the external air, a piston in said cylinder, a spring for normally holding said piston at the end of the cylinder open to the external air, a rod connecting said piston with the movable lamp, and a valve for controlling the communication between the engine and said cylinder.

12. The combination with an internal combustion engine, and a movable lamp, of a stationary cylinder with one end in communication with the engine and the other end open to the external air, a hollow piston in said cylinder adapted to hold lubrication, a spring for normally holding said piston at the end of the cylinder open to the external air, a rod connecting said piston with the movable lamp, and a valve for controlling the communication between the engine and said cylinder.

13. The combination with an internal combustion engine and a movable lamp, of a stationary cylinder with one end in communication with said engine and the other end open to the external air, a piston in said cylinder formed of a cup shaped member, a leather disk closing the open end of said cup shaped cylinder and surrounding the periphery thereof, a piston rod extending through said cup shaped portion of the piston and connected with the movable lamp, means for securing said piston to said cylinder so as to hold the parts of the piston together, and a spring in the cylinder for normally holding the piston at the end of the cylinder open to the outer air, said spring being weaker than the external air pressure.

14. The combination with an internal combustion engine, and a movable lamp, of a stationary cylinder with one end in communication with said engine and the other end open to the external air, a piston in said cylinder formed of a cup shaped member, a leather disk closing the open end of said cup shaped member surrounding the periphery thereof, a piston rod connected with the movable lamp and extending from said piston and having a cylinder for engaging the outer surface of the cup shaped member of the piston, a washer on the inner end of the piston of substantially the same diameter as said cup shaped member and holding the leather disk against said member, a nut on the inner end of said rod for holding the washer in place, and a spring in the cylinder for normally holding the piston at the end of the cylinder open to the outer air, said spring being weaker than the external air pressure.

15. The combination with an internal combustion engine, of a lamp structure having a reflector hinged at one edge thereof and elsewhere being free to tilt, a lamp secured in said reflector, and means controlled by the suction of the engine for moving said reflector.

16. The combination with an internal combustion engine, of a lamp structure having a lamp casing, a split reflector, consisting of an annular forward portion secured stationary to the lamp casing, and a rear portion of the reflector hinged at one edge so as to be free elsewhere to move, a lamp secured to the movable part of said reflector, and means controlled by the suction of the engine for moving said movable portion of the reflector.

17. The combination with an internal combustion engine, of a lamp structure having a casing, a split reflector formed of two parts, one of said parts being annularly secured to the lamp casing, and forming the forward portion of the reflector, and a rear portion of said reflector being hinged at one edge of said stationary portion of the reflector so as to be free to move elsewhere, a lamp mounted in the movable portion of said reflector, and means controlled by the suction of the engine for moving said movable portion of the reflector.

18. The combination with an internal combustion engine of a lamp structure having a lamp casing, a reflector formed of two parts, the forward portion being annular and secured to the lamp casing and the rear portion of the reflector being movable with its forward part overlapping and surrounding said front portion of the reflector, being hinged at its front edge to the front portion of the reflector so as to be free to tilt, a lamp mounted in the movable portion of said reflector, and means controlled by the suction of the engine for moving said movable portion of the reflector.

19. The combination with an internal combustion engine, and a movable lamp of mechanism for moving said lamp, and means for utilizing the highest degree of partial vacuum caused by the engine for controlling the operation of said mechanism.

20. The combination with an internal combustion engine, and a movable lamp of means for moving the same, and a conduit leading therefrom to the intake of the engine for utilizing the partial vacuum of said intake for causing the operation of said lamp moving means, and means for maintaining the highest degree of partial vacuum in said conduit, which may have been imparted thereto by the engine since the last operation of the lamp moving means.

21. The combination with an internal combustion engine, and a movable lamp, of means connected with the lamp for moving the same, a conduit leading therefrom to the intake of the engine for utilizing the partial vacuum of said intake for causing the operation of said lamp moving means, and a valve in said conduit for controlling the partial vacuum therein, and a check valve in said conduit between the intake of the engine and said controlling valve.

22. The combination with an internal combustion engine, and a movable lamp of means for moving said lamp that is controllable by suction, a conduit leading to said means from the intake manifold of the engine, a controlling valve in said conduit, a vacuum chamber connected with said conduit between the intake manifold and said valve, and a check valve between said vacuum chamber and the intake manifold of the engine.

23. The combination with an internal combustion engine, and a movable lamp, of means controlled by the suction of the engine for moving said lamp, and a spring for causing the return of said lamp to normal position.

In witness whereof, I have hereunto affixed my signature.

SAMUEL F. ARBUCKLE.